(12) United States Patent
Miwa et al.

(10) Patent No.: US 9,032,055 B2
(45) Date of Patent: *May 12, 2015

(54) NETWORK IDENTIFIER CONFIGURATION METHOD, COMMUNICATION METHOD AND WIRELESS COMMUNICATION TERMINAL

(75) Inventors: Yasutaka Miwa, Tokyo (JP); Kenjiro Komaki, Saitama (JP); Tetsuo Watanabe, Chiba (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 1331 days.

This patent is subject to a terminal disclaimer.

(21) Appl. No.: 11/256,657

(22) Filed: Oct. 20, 2005

(65) Prior Publication Data

US 2006/0067290 A1 Mar. 30, 2006

Related U.S. Application Data

(63) Continuation of application No. PCT/JP2005/007327, filed on Apr. 15, 2005.

(30) Foreign Application Priority Data

May 7, 2004 (JP) .................................. 2004-139179

(51) Int. Cl.
G06F 15/177 (2006.01)
G06F 15/16 (2006.01)
(Continued)

(52) U.S. Cl.
CPC ........... *A63F 13/12* (2013.01); *A63F 2300/204* (2013.01); *A63F 2300/402* (2013.01);
(Continued)

(58) Field of Classification Search
CPC ..... H04L 63/065; H04W 84/18; H04W 88/06
See application file for complete search history.

(56) References Cited

U.S. PATENT DOCUMENTS 6,842,460 B1 * 1/2005 Olkkonen et al. ............. 370/465
7,412,542 B1 * 8/2008 Newson et al. ............... 709/249
(Continued)

FOREIGN PATENT DOCUMENTS

EP 1 066 868 1/2001
JP 2001-053901 2/2001
(Continued)

OTHER PUBLICATIONS

The translation of International Preliminary Report on Patentability and Written Opinion of the International Searching Authority mailed Nov. 23, 2006.
(Continued)

*Primary Examiner* — Dang Ton
*Assistant Examiner* — Ryan Kavleski
(74) *Attorney, Agent, or Firm* — Katten Muchin Rosenman LLP

(57) ABSTRACT

A game device is provided with an SSID setting unit and a channel setting unit. The SSID setting unit sets up an SSID to include an application ID uniquely defined for an application to be executed. For example, when an application A is executed, the SSID is set up to include "TITLE_A". When an application B is executed, the SSID is set up to include "TITLE_B". The channel setting unit sets up a communication channel based on the SSID such that the communication channel used in the BSSs do not overlap each other as much as possible.

10 Claims, 7 Drawing Sheets

| DATA ITEM | TARGET OF ASSIGNMENT | CHARACTER STRING |
|---|---|---|
| TERMINAL PREFIX | GAME DEVICE | PT |
| APPLICATION ID | TITLE A | TITLE_A |
| | TITLE B | TITLE_B |
| APPLICATION STATUS VALUE | LOBBY STAGE | LOBBY |
| | GAME STAGE | GAME + RANDOM CHARACTER STRING |

(51) Int. Cl.
*A63F 13/30* (2014.01)
*H04W 48/08* (2009.01)

(52) U.S. Cl.
CPC ..... *A63F2300/406* (2013.01); *A63F 2300/408* (2013.01); *A63F 2300/535* (2013.01); *A63F 2300/5566* (2013.01); *A63F 2300/572* (2013.01); *H04W 48/08* (2013.01)

(56) References Cited

U.S. PATENT DOCUMENTS

| | | | | |
|---|---|---|---|---|
| 2001/0053691 | A1* | 12/2001 | Harma | 455/419 |
| 2002/0098889 | A1* | 7/2002 | Sato et al. | 463/40 |
| 2004/0063498 | A1* | 4/2004 | Oakes et al. | 463/42 |
| 2004/0082361 | A1* | 4/2004 | Rajagopalan | 455/556.1 |
| 2004/0082383 | A1 | 4/2004 | Muncaster et al. | |
| 2004/0087369 | A1* | 5/2004 | Tanaka et al. | 463/42 |
| 2004/0192366 | A1* | 9/2004 | Lai et al. | 455/519 |
| 2004/0198392 | A1* | 10/2004 | Harvey et al. | 455/456.1 |
| 2004/0229606 | A1* | 11/2004 | Oshima et al. | 455/426.2 |
| 2004/0259642 | A1* | 12/2004 | Tanaka et al. | 463/42 |
| 2005/0232209 | A1* | 10/2005 | Buckley et al. | 370/338 |
| 2005/0250487 | A1* | 11/2005 | Miwa et al. | 455/422.1 |
| 2005/0286456 | A1* | 12/2005 | McNew et al. | 370/312 |
| 2006/0034315 | A1* | 2/2006 | Maekawa et al. | 370/432 |
| 2006/0068702 | A1* | 3/2006 | Miwa et al. | 455/41.1 |
| 2011/0219024 | A1* | 9/2011 | Arrouye et al. | 707/769 |

FOREIGN PATENT DOCUMENTS

| | | |
|---|---|---|
| JP | 2002-224449 | 8/2002 |
| JP | 2002-281048 | 9/2002 |
| WO | 2004/032536 | 4/2004 |
| WO | 2005/002265 | 1/2005 |

OTHER PUBLICATIONS

Supplementary European Search Report dated Jun. 21, 2011, from corresponding European Application No. 05 73 0646.

* cited by examiner

FIG.5

| TERMINAL PREFIX | APPLICATION ID | APPLICATION STATUS VALUE | USER-SPECIFIED CHARACTER STRING |
| --- | --- | --- | --- |

FIG.6

| DATA ITEM | TARGET OF ASSIGNMENT | CHARACTER STRING |
|---|---|---|
| TERMINAL PREFIX | GAME DEVICE | PT |
| APPLICATION ID | TITLE A | TITLE_A |
| | TITLE B | TITLE_B |
| APPLICATION STATUS VALUE | LOBBY STAGE | LOBBY |
| | GAME STAGE | GAME + RANDOM CHARACTER STRING |

NETWORK IDENTIFIER CONFIGURATION METHOD, COMMUNICATION METHOD AND WIRELESS COMMUNICATION TERMINAL

CROSS-REFERENCE TO RELATED APPLICATION

This application is a continuation of International Application PCT/JP05/007327 filed on Apr. 15, 2005, pending at the time of filing of this continuation application and claims priority from Japanese Patent Application 2004-139179 filed on May 7, 2004, the contents of which are herein wholly incorporated by reference.

BACKGROUND OF THE INVENTION

1. Field of the Invention

The present invention relates to a technology for communicating between a plurality of communication terminals and, more particularly, to a technology of efficiently setting up a network identifier in a wireless network.

2. Description of the Related Art

With the realization of miniaturization and lightweight of information terminals, it has become common for people to carry an information terminal. Wireless communication environment in which a plurality of users can enjoy an application such as a game together using infrastructure such as base stations and access points has become a reality in recent years. Study has also been undertaken on the construction of wireless ad hoc network for on-demand communication. In an ad hoc network, base stations and access points are not necessary. It is therefore easy to build a wireless network even in places where no such infrastructure exists. In an ad hoc network, a plurality of users can enjoy a game together as they join each other, bringing their own portable game devices and communicating wirelessly.

An infrastructure network and an ad hoc network are built using technologies such as IEEE802.11 or Bluetooth. A wireless communication environment assumed conventionally is such that several terminals are brought together so that communication is achieved between the terminals. In an infrastructure network or an ad hoc network, however, a situation could occur in which as many as 10-100 terminals are brought together in the same environment.

In a wireless network using IEEE802.11, a Basic Service Set (BSS) is prescribed as a basic unit of group comprising terminals communicating with each other. BSS refers to a set which is a group of mutually communicating terminals. Terminals belonging to the same BSS can communicate with each other. A BSS is identified by a 48-bit identifier known as Basic Service Set ID (BSSID). A unique value in the environment is assigned to a BSSID. There is also available a Service Set ID (SSID) comprised of a character string of 0-32 bytes to discriminate between BSSs. SSID may be arbitrary set up. The same SSID may be assigned to a plurality of BSSs. A BSS is formed by a terminal or an access point transmitting a reference packet called beacon. The range reached by the beacon defines a spatial range of the BSS. A plurality of BSSs may be located in the same physical space.

When using a wireless network using IEEE802.11, a terminal is required to belong to one of the BSSs available. For this purpose, the terminal searches for (scans) BSSs located in its neighborhood. When participating in an existing group, the terminal may specify an SSID in case it has the knowledge of the SSID of a group in which participation is sought. In contrast, if the SSID is not known, the terminal scans all BSSs in its neighborhood and specifies an SSID selected from the SSIDs identified as a result of the search.

In a wireless LAN system of the infrastructure mode using access points, an access point transmits a beacon so as to form a BSS. In a majority of cases, an access point is connected to the Internet or a private network such as an enterprise network. Normally, a manager of such a network determines an SSID and sets up an access point accordingly. Uses of the network are informed of the SSID from the network manager and are involved in wireless communication accordingly.

In a wireless LAN system of an ad hoc mode not using access points, a network manager is not available. Therefore, users of the network have to determine an SSID themselves for connection. In this case, mutual connection is impossible unless the terminals select the same SSID. Therefore, it is necessary for the users to agree upon an SSID prior to communication. Since an SSID can be arbitrarily set up, connection may be established to an undesired wireless network if the same SSID is used in different groups. Since an SSID can be arbitrarily set up, the purpose of a wireless network is not known merely by referring to an SSID retrieved from a nearby BSS as a result of a search. Thus, setting of an SSID in an ad hoc network is a complicated process for users to perform. Further, stability in communication is difficult to achieve in an environment in which a large number of wireless networks are built in the same environment.

SUMMARY OF THE INVENTION

Accordingly, the present invention relates to a technology of efficiently setting up a network identifier in a wireless network.

In one embodiment of the present invention, there is provided a network identifier setting method wherein a network identifier is set up to include an application identifier uniquely defined for an application executed in a wireless communication terminal.

In another embodiment of the present invention, there is provided a communication method comprising: generating a network identifier that includes an application identifier uniquely defined for an application executed in a wireless communication terminal; and participating in a wireless network based on the network identifier generated.

In still another embodiment of the present invention, there is provided a wireless communication terminal comprising: a network identifier setting unit which sets up a network identifier to include an application identifier uniquely defined for an application to be executed; and a channel setting unit which sets up a communication channel based on the network identifier set up.

Arbitrary combinations of the aforementioned constituting elements and implementations of the invention in the form of methods, apparatuses, systems, recording mediums and computer programs may also be practiced as additional modes of the present invention.

According to the present invention, there is provided a technology for efficiently setting up a network identifier in a wireless network.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 5 shows an SSID format according to the illustrative example of the invention;

FIG. 6 shows an example of correspondence between data items in the SSID format and character strings assigned.

DETAILED DESCRIPTION OF THE INVENTION

Figure 1:
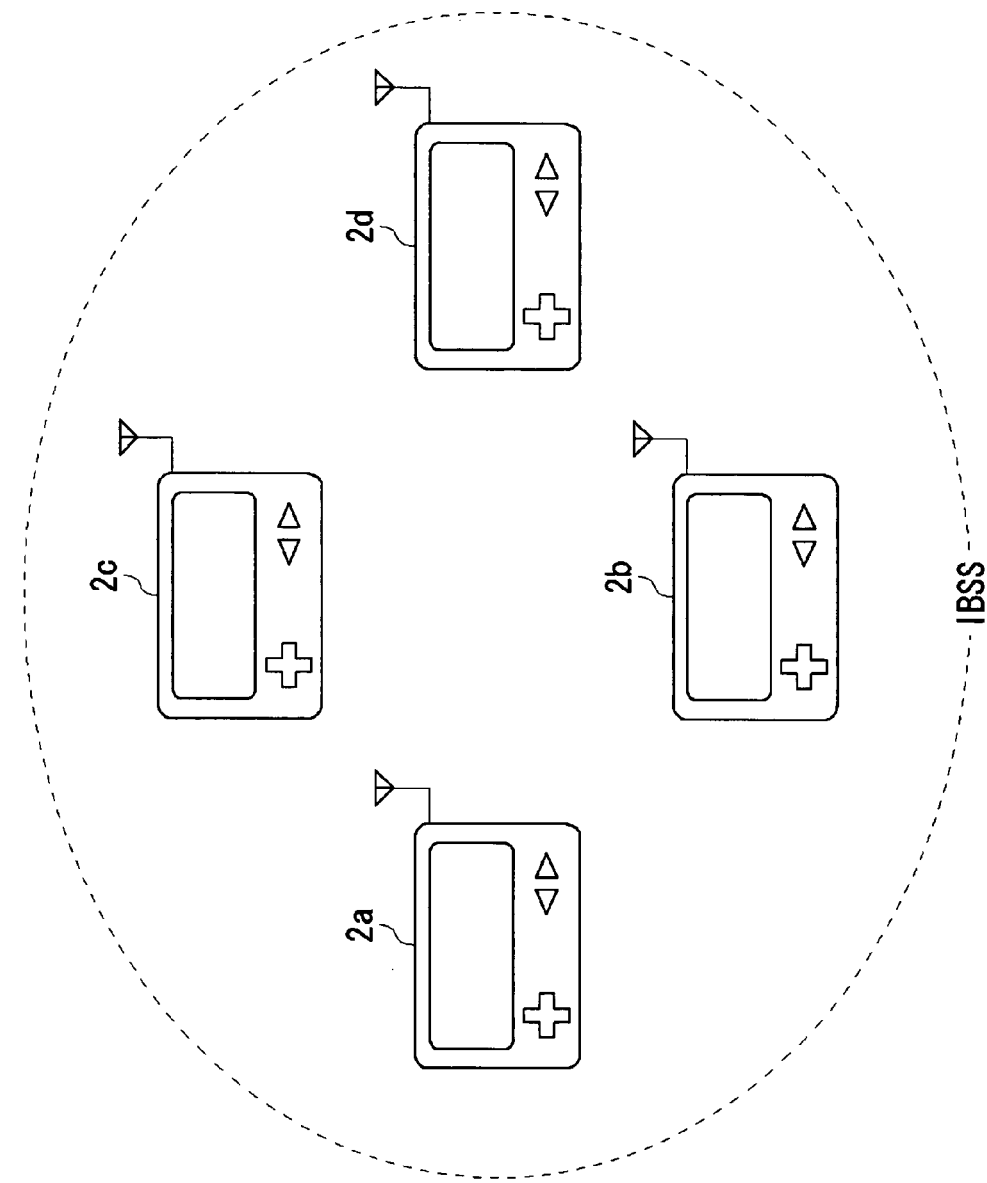
FIG. 1 shows an IBSS in an ad hoc network using IEEE802.11.

FIG. 1 is a schematic illustration of an Independent Basic Service Set (IBSS) in an ad hoc network using IEEE802.11. IBSS corresponds to a wireless network. Stations in the IBSS can directly communicate with each other. In FIG. 1, four game devices 2a, 2b, 2c and 2d are illustrated as examples of wireless communication terminals (stations). The number of game devices 2 constituting the IBSS is not limited to four. Any number of devices other than four may constitute the set. Each of the game devices 2 is provided with a wireless communication function. By bringing a plurality of game devices 2 together, a wireless network is built. A wireless ad hoc network is built by using a wireless LAN standard such as IEEE802.11. In the IBSS, communication between a plurality of game devices 2 is achieved by building an ad hoc network without requiring infrastructure such as base stations and access points.

Figure 2:
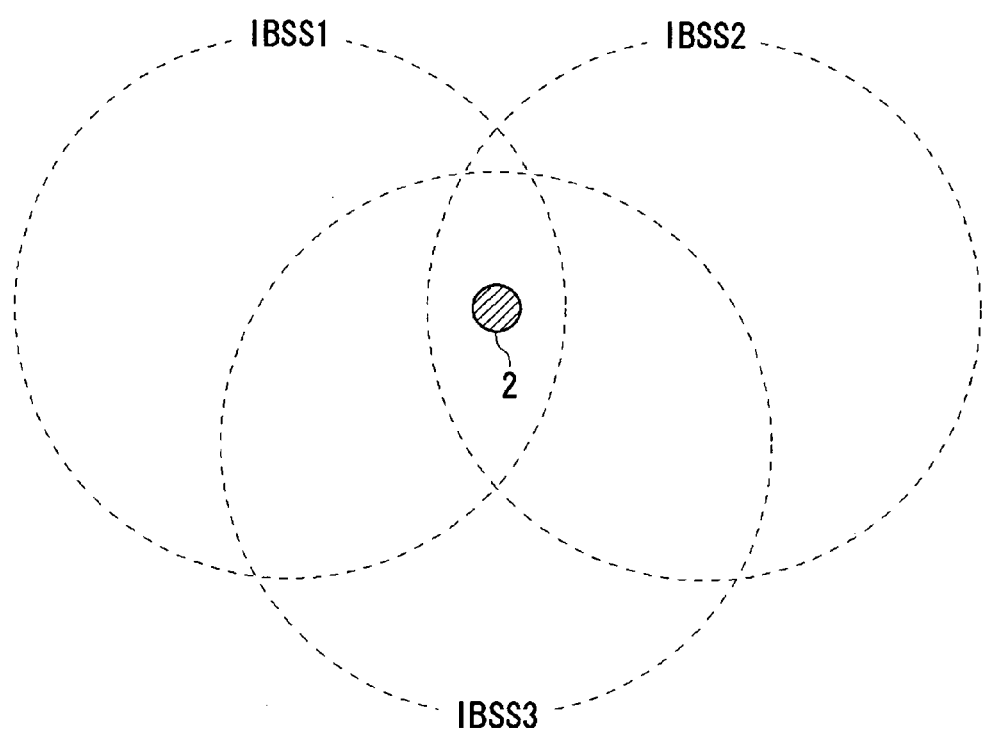
FIG. 2 shows a state in which a plurality of IBSSs are formed in a single environment.

FIG. 2 shows a state in which a plurality of IBSSs are formed in a given environment. In the example of FIG. 2, three IBSSs are formed. The game device 2 is located in the communication range of IBSS1, IBSSS2 and IBSS3. The communication range of IBSS is called a basic service area. The basic service area is determined by the propagation characteristic of a wireless medium. For example, when members of each I-BSS are running a game application, the game device 2 is capable of participating in the game by subscribing to the IBSS in which the game application desired to be played is being run.

Figure 3:
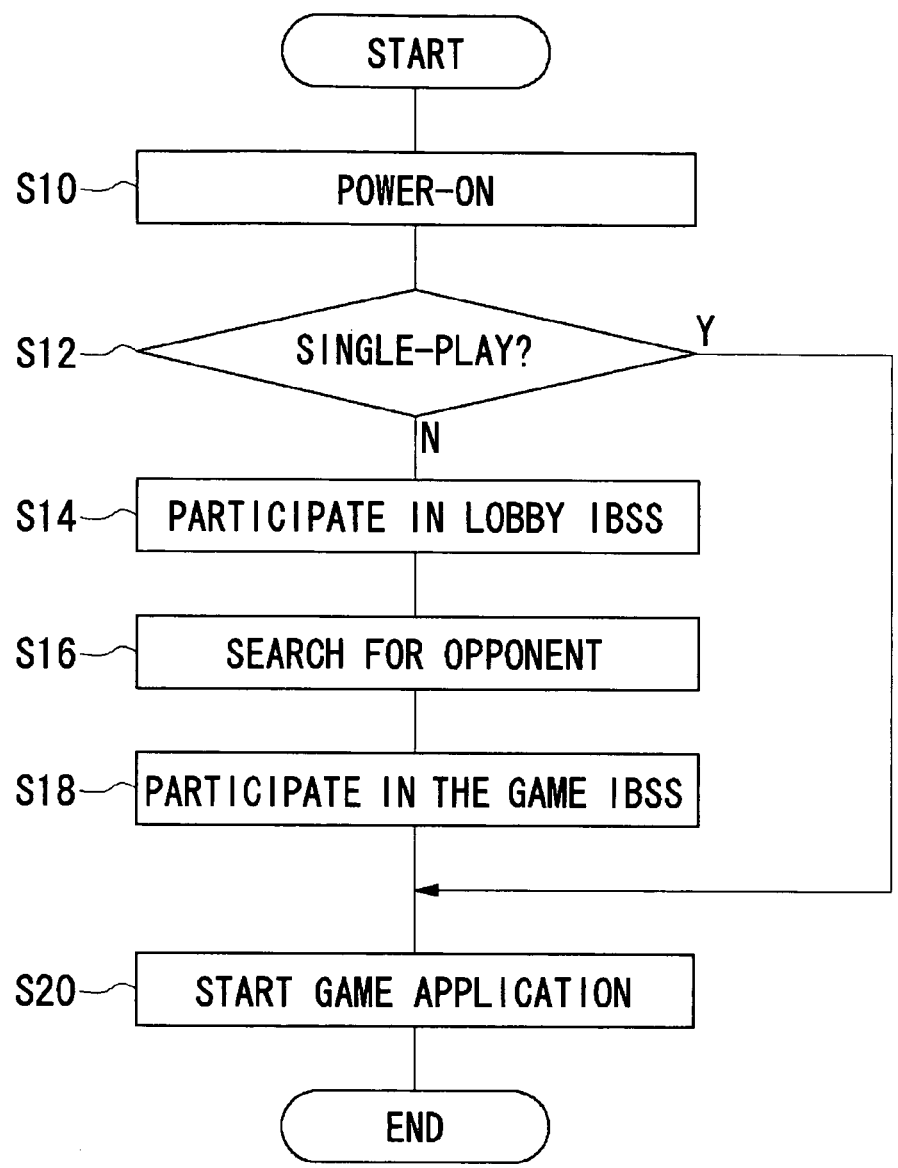
FIG. 3 is a flow chart of steps performed until a player starts a game application according to an illustrative example of the invention.

FIG. 3 is a flow chart of steps performed until a player starts a game application according to the illustrative example of the invention. Initially, the player turns the power of the game device 2 on (S10). It will be assumed that a recording medium storing a game program played is inserted in a media drive of the game device 2. The recording medium may store a program for communication. The program for communication may be stored in a ROM of the game device 2.

When the power is turned on, the game program is read from the recording medium so that the game application is started. The display screen of the monitor of the game device 2 prompts the user to select "a single-player mode" or "a multiple-player mode". "A multiple-player mode" represents a match-up mode of play in, for example, a beat'-em-up game. By selecting the match-up mode, the user can enjoy playing a game with other users over a wireless network. When a single play is selected (Y in S12), the game application is started (S20) so that the player can enjoy a game in a single-player mode.

When a match-up mode is selected (N in S12), the game device 2 participates in a lobby IBSS (S14). In the game system according to this example, a lobby IBSS plays a role of a lobby room in which the game device 2 searches for another game device or negotiates with another game device for match-up. The SSID of a lobby IBSS (hereinafter, referred to as "lobby SSID") is an identifier for identifying a network. A unique lobby SSID is set up for each game title. By setting up lobby IBSSs in a manner dependent on each of individual game titles, only the game devices that play the same game are brought together in a lobby IBSS. By bringing together players playing the same game, players can search for an opponent in a match-up easily. As such, the value of a lobby IBSS will be enhanced.

The lobby SSID may directly be written in a game program. In this case, the game device 2 reads the lobby SSID from the game program and searches for an IBSS having the SSID. With this, it is possible to find a desired lobby IBSS. By acquiring the BSSID of the lobby IBSS, the game device 2 can participate in the lobby IBSS. In comparison with an exhaustive search for lobby IBSSs in the entire neighborhood, time required for a search is reduced and time required for connection is reduced accordingly. Another advantage of this approach is that it is not necessary for users to agree upon an SSID. Therefore, time required for connection is reduced in this respect, too.

The lobby SSID may not be written in a game program in order to prevent extra load from being imposed on a producer of the game program. In this case, a lobby ID uniquely assigned to each of individual game titles is written in the game program. The communication program generates an SSID on the basis of the lobby ID. The lobby ID may preferably be defined as a simple character string. A lobby ID may have the role of a game ID specifying a game title. By not requiring attention from the producer of a game program to the SSID and by allowing the communication program to automatically generate an SSID, extra load is prevented from being imposed on the producer of the game program.

The game device 2 sets up a frequency channel to be used based on the lobby SSID. An algorithm for setting up a channel based on the SSID may preferably be built in the communication program. The algorithm is shared by all game devices 2. The game devices 2 each sets up the same frequency channel based on the same lobby SSID. By determining the lobby SSID and the frequency channel as described above, the game device 2 can participate in the lobby IBSS.

The game device 2 that participated in the lobby IBSS searches for an opponent for match-up already participating in the lobby IBSS (S16). The game devices participating in the lobby IBSS broadcast terminal information packets indicating their status. The searching game device 2 can have the knowledge of game devices connected to the same wireless network (lobby SSID) and terminal information thereof, by receiving terminal information packets from other game devices. A list generated as a result of the search is displayed on a monitor of the game device 2. When the user determines an opponent, the game device 2 determines a new SSID and a new frequency channel with the opponent and participates in the game IBSS (S18). The game IBSS has the role of a game room in which to play match-up. When entering the game IBSS, the frequency channel is set up based on the SSID of the game IBSS (hereinafter, referred to as a game SSID). Accordingly, the same frequency channel is set up based on the same SSID in the game device 2 and in the opponent. Subsequently, the game application is started in the game device 2 (S20). By exchanging information with the opponent in the group using the frequency channel thus set up, the user can enjoy a match-up game play.

Figure 4:
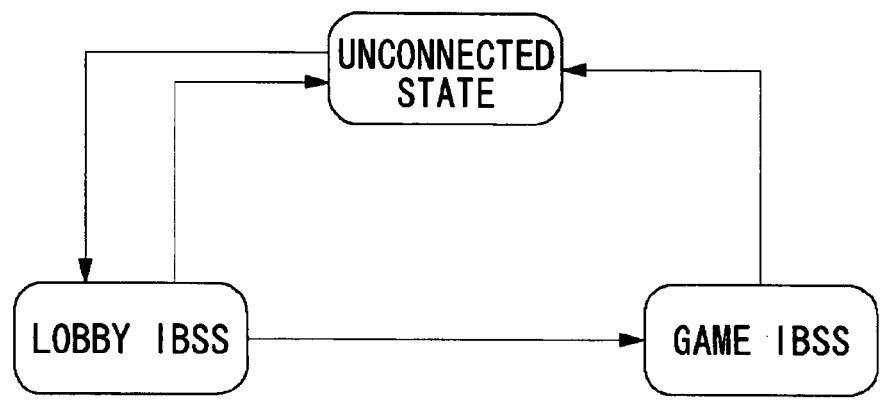
FIG. 4 shows transition between communication states of a game device.

FIG. 4 is a diagram illustrating transition between states of the game device. In the ad hoc network of the example, three communication states are established, i.e., an unconnected state in which the game device is not participating in any IBSSs, a state in which the game device is participating in a lobby IBSS and a state in which the game device is participating in a game IBSS. Communication is established in a lobby stage and in a game stage.

The unconnected state corresponds to a state occurring immediately after power-on of the game device 2 or a state in which the user plays in a single-player mode. When the user selects a match-up mode in the unconnected state, the game device 2 enters the lobby IBSS. In the lobby IBSS, the user searches for an opponent and determines an opponent.

The game device 2 participating in the lobby IBSS can enter a game IBSS dedicated to a group participating in a match-up. In order to enter the game IBSS, a game IBSS parameter used in the group is shared. For example, one of the members constituting the group may generate a game IBSS parameter so that the parameter is shared by notifying the other members of the parameter. The parameter may be an SSID or an available frequency band. The game device 2 enters the game IBSS by setting the game IBSS parameter in a library. The game IBSS is a group constituted by a plurality of game devices playing the game at the same time and represents an individual wireless network set up for the group. A plurality of game IBSSs may be located in the same environment.

The game device 2 can return from the lobby IBSS or the game IBSS back to the unconnected state at an arbitrary point of time. When returning from the game IBSS to the lobby IBSS, the game device 2 temporarily makes a transition to the unconnected state before participating in the lobby IBSS.

When power saving control or control for avoidance of signal collision is applied in the game system according to the example, different modes of control may be applied to the lobby IBSS and to the game IBSS. The lobby IBSS and the game IBSS may differ in requirement for latency, etc. Therefore, efficient communication is achieved by applying different modes of control to individual IBSSs established.

FIG. 5 shows an SSID format according to the example. In this example, each game device 2 is provided with the function of generating the SSID format. An SSID format comprises "terminal prefix", "application ID", "application status value" and "user-specified character string". An SSID is written as a set comprising at least one of these data items. The data items are connected to each other by a connecting character "-".

A terminal prefix represents information indicating a terminal type. Basically, a terminal prefix is a character string permanently allocated to each of the types of terminals. In this example, it will be assumed that the same terminal prefix is allocated to all game devices 2. With this, the SSID generated accordingly is differentiated from the SSID used in the types of terminals other than the game devices 2. The likelihood of the same SSID being shared with the other types of terminals is eliminated with a high probability.

An application ID (identifier) indicates application information and is basically a character string permanently assigned to each application. In this example, a unique application ID is assigned to each game title. Basically, different application IDs are assigned to different game titles. If the same communication protocol is used in different applications or if the circumstances require communication between different applications, the same application ID may be assigned to the different applications.

An application status value indicates the status related to the execution of an application and is a character string assigned when different wireless networks are desired to be used depending on the status of the application. In an SSID, the application status value is appended to the application ID.

For example, if two types of wireless networks including the lobby IBSS and the game IBSS are formed in a given game application as shown in FIG. 4, the application status value set to "LOBBY" may indicate a lobby mode and the application status value set to "GAME" may indicate a game mode. The application status value may be defined for each terminal type. Alternatively, a unique application status value may be defined for each application.

A user-specified character string is a character string specified by the user. For example, if a specific group of users wish to enjoy a chat, the users can form a unique lobby IBSS by generating a user-specified character string.

In this example, a situation in which two game titles A and B are being run. Each of the game applications is provided with a lobby stage and a game stage as mentioned before. The game device 2 searches for an opponent and determines an opponent in the game stage and plays match-up with the opponent thus determined in the game stage.

FIG. 6 shows an example of correspondence between data items in the SSID format and character strings assigned. In the data item "terminal prefix", a character string "PT" is assigned to the game device.

In the data item "application ID", a character string "TITLE_A" is assigned to the game application with a title A and a character string "TITLE_B" is assigned to the game application with a title B.

In the data item "application status value", a character string "LOBBY" is assigned to the lobby stage and a character string "GAME+random character string" is assigned to the game stage.

The setting of SSID is executed by a communication program common to all game devices 2. Basically, the users need not set up the SSID themselves and can participate in a desired wireless network with reduced time required for connection. By setting up an SSID to include an application ID unique to a game title, it is ensured that applications do not share the same SSID. Accordingly, the possibility of the game device 2 connecting to a BSS in which an undesired application is being run is avoided.

Referring to the flowchart of FIG. 3, when the match-up mode of the game application A is selected in S12, the SSID of the wireless network in the ad hoc network mode would be "PT_TITLE_A-LOBBY". The wireless network identified by the SSID "PT_TITLE_A-LOBBY" corresponds to the lobby IBSS in the game application A. When the game devices 2 running the game application A set up the same lobby SSID, the game devices 2 requesting a match-up can bring themselves together in the same lobby IBSS.

When the game device 2 determines an opponent in the lobby IBSS, the game device 2 shares a randomly generated character string with the opponent. For example, one of the game devices 2 may randomly generate a character string and notify the other game device 2 of the character string so as to share the random character string. If the random character string "GLX4C1X" is set, for example, the SSID would be "PT_TITLE_A-GAME+GLX4C1X". The wireless network identified by the SSID "PT_TITLE_A-GAME+GLX4C1X" corresponds to the game IBSS in which the game application A is run in the opponents. By changing the application status value in the SSID when making a transition from the lobby stage to the game stage, it is possible to avoid communication interference with the game devices in the lobby stage. By allowing the opponents to set up a game SSID using a random character string, it is possible to avoid connection with game devices other than the opponent.

For reduction of radio interference between a plurality of IBSSs, the communication channels used in the IBSSs may preferably be spread over an available frequency band. As an example, the communication channels of the IBSSs may be set up such that the communication channel used in the lobby IBSS and the communication channel used in the game IBSS do not overlap. It is expected that a large number of game devices 2 are brought together in the lobby IBSS. Therefore, for stability of communication in the lobby IBSS, the communication channel of the game IBSS may suitably be different from the communication channel of the lobby IBSS. It is also expected that the volume of data transmitted in the game IBSS is large when a game application with a severe requirement for real time processing is run. Accordingly, the communication channel of the game IBSS may suitably be different from that of the game IBSS from the perspective of the stability in communication in the game IBSS as well.

The communication channel may be set up based on the SSID. For example, a game SSID may be subject to an operation using a hash function. A communication channel adapted for the result of operation may be selected from the communication channels that remain available after the communication channel of the lobby IBSS is excluded from the entire set of communication channels available in IEEE802.11. The type of operation may be optional. By using a predetermined function, the communication channels of the game IBSSs can be spread as much as possible. A simple method of operation may be to subject the bit data of the game SSID to modulo operation using the number of communication channels that remain available after the communication channel of the lobby IBSS is excluded. A communication channel may be determined by referring to the remainder of the operation. The communication channels that are not used in the lobby IBSS may be numbered and the numbers may be associated with the values of the remainder in one to one relation. With this, channel setting units 16 in the game devices 2 are capable of spreading the communication channels over a range prescribed for the environment. The aforementioned operation is implemented by a communication channel setting algorithm common to all game devices 2. Accordingly, the communication channel is uniquely determined in each of the game devices 2 based on the SSID. By setting up a channel for each SSID, radio interference between ad hoc networks is reduced.

Communication channels may be set up by the aforementioned algorithm based on the SSID in the lobby IBSS as well as in the game IBSS. The communication channel of the lobby IBSS and the communication channel of the game IBSS may overlap but, systemically, this will result in the communication channels of the IBSSs being spread over an available frequency band, averaging traffic in the communication channels. One example of using a hash function to set up a communication channel is to apply a hash function to the application ID in an SSID. By allowing one of the game devices 2 in an IBSS to set up a communication channel and to notify the other game devices of the communication channel thus set up, the entire group can share the communication channel. When setting up a communication channel, the communication channels may be scanned so as to select a low-traffic communication channel.

Referring to FIG. 6 again, if the user specifies "Group_ABC" as a user-specified character string when the game device 2 enters the lobby IBSS of the game application B, the SSID would be "PT-TITLE_B-LOBBY-Group_ABC". The wireless network identified by the SSID "PT-TITLE_B-LOBBY-Group_ABC" corresponds to the lobby IBSS dedicated to the game application B. By building a character string arbitrarily specified by the user into the SSID, the possibility of undesired terminals participating in the dedicated lobby IBSS is reduced. The character string "GAME" indicating the game stage may be modified to "GAME_OPEN" if it is possible to participate in the game in the middle or "GAME_CLOSED" if it is impossible to participate in the game in the middle.

As described above, by embedding parameters such as terminal type, application type and application status value in the SSID, the game device 2 can have the knowledge of the purpose and status of the wireless networks currently located in the surrounding area by searching for BSSs. By searching for a BSS with an SSID that includes "PT-TITLE_A", it is possible to retrieve only those BSSs that are running the game application A.

FIG. 5 is a functional block diagram of the game device 2. The game device 2 is formed as a wireless communication terminal and is provided with a processor 10 primarily performing operations related to games and an air interface apparatus 40 performing operations related to communication. The processor 10 and the air interface apparatus 40 are provided as separate hardware. The processor 10 and the air interface apparatus 40 are electrically connected to each other by a bus. The processor 10 is formed as a host PC and is provided with the function of managing the operation of the air interface apparatus 40.

Figure 7:
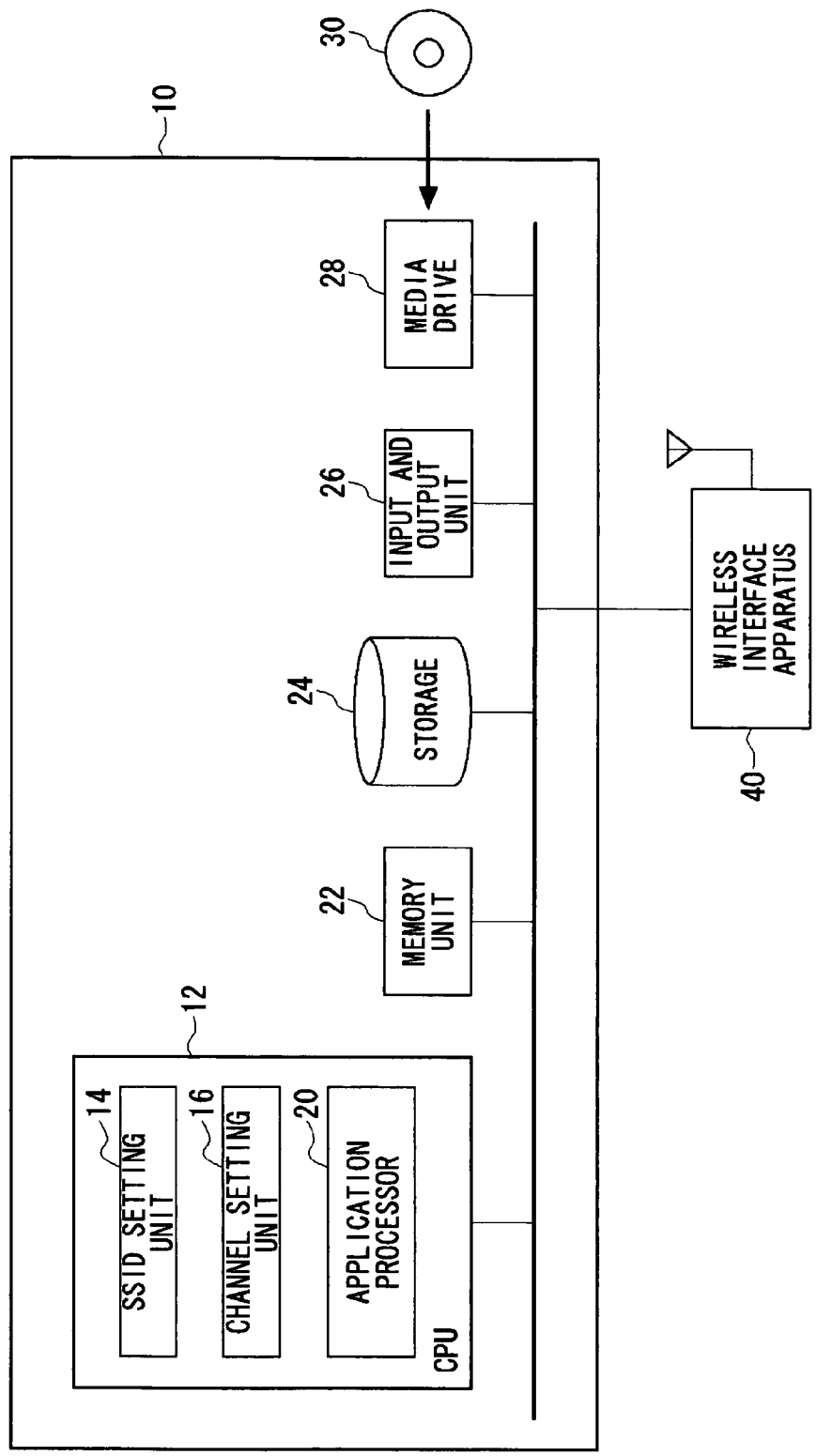
FIG. 7 is the functional block diagram of a game device.

Functions for communication in this example are implemented in the processor 10 and the air interface apparatus 40 by a CPU, a memory, a program loaded into the memory and the like. FIG. 7 depicts functional blocks implemented by the cooperation of the elements. The program may be built in the game device 2 or supplied from an external source in the form of a recording medium. Therefore, it will be obvious to those skilled in the art that the functional blocks may be implemented by a variety of manners including hardware only, software only or a combination of both. In the illustrated example, a CPU 12 of the processor 10 is provided with the functions of an SSID setting unit 14, a channel setting unit 16 and an application processor 20. The SSID setting unit 14 sets up an SSID for identifying a network. The channel setting unit 16 sets up a communication channel.

An input and output unit 26 accepts an input from a user and provides an output to the user. More specifically, the unit 26 as an input unit comprises a group of buttons including an arrow key that accept commands from a user for operation. The unit 26 as an output unit is provided with a monitor and speaker. Storage 24 is formed as an external storage device such as a memory stick and is used, for example, to save game data for later retrieval. A disc-shaped recording medium 30 is inserted into a media drive 28 so that programs and data stored in the recording medium 30 are read. The programs and data thus read are stored in a memory unit 22 and used in processes in the CPU 12.

When the power of the game device 2 is turned and the user selects a match-up mode, the SSID setting unit 14 sets up the SSID of the lobby SSID. In this case, it will be assumed that the lobby ID written in the game program is acquired so as to generate the SSID of the lobby IBSS from the lobby ID. The lobby SSID is uniquely determined from the lobby ID. As already described, by setting up the lobby ID for each game title, the same lobby SSID is determined in the game devices 2, given the same game title. As shown in FIG. 6, the lobby SSID of the game title A is determined to be "PT-TITLE_A-LOBBY" based on the lobby ID of the game title A. Similarly, the SSID of the game title B is determined to be "PT-TITLE_B-LOBBY" based on the lobby ID of the game title B. The recording medium 30 stores a game program of the game title A and so the SSID setting unit 14 generates the lobby SSID "PT-TITLE_A-LOBBY". The channel setting unit 16 sets up a communication channel based on the SSID generated by the SSID setting unit 14. The channel setting function in the channel setting unit 16 is built in all game devices 2 as a common algorithm. Accordingly, the game devices 2 set up the same communication channel based on the same SSID.

The lobby SSID "PT-TITLE_A-LOBBY" set up in the SSID setting unit 14 and the communication channel set up in the channel setting unit 16 are sent to the wireless interface apparatus 40. The wireless interface apparatus 40 connects to the IBSS having the SSID "PT-TITLE_A-LOBBY" using the communication channel thus set up. With this, the game device 2 can participate in the lobby IBSS.

Subsequently, if the user selects a match-up mode, the SSID setting unit 14 generates a random character string and sets up a game SSID accordingly. If another game device in the group sets up the game SSID, the SSID setting unit 14 acquires the SSID set up via the wireless interface apparatus 40 and uses the acquired SSID as the game SSID. The channel setting unit 16 sets up a communication channel based on the SSID thus set up. The channel setting unit 16 sets up a communication channel of a frequency band different from that of the communication channel used in the lobby IBSS. The communication channel is set up based on the generated SSID such that the communication channel set up does not overlap the communication channels used in the other game IBSSs.

The game SSID set up in the SSID setting unit 14 and the communication channel set up in the channel setting unit 16 are sent to the wireless interface apparatus 40. The wireless interface apparatus 40 connects to the game IBSS using the communication channel thus set up. With this, the game device 2 can participate in the game IBSS.

The application processor 20 executes the game program. An input from a player for operation is transmitted to other game devices within the group via the air interface apparatus 40. Inputs from other game devices within the group are received via the air interface apparatus 40 and processed by the application processor 20.

Described above is an explanation based on the illustrative example. The example of the invention is only illustrative in nature and it will be obvious to those skilled in the art that variations in constituting elements and processes are possible within the scope of the present invention. In the above example, a description has been given of generation of an IBSS in an ad hoc network. The present invention is not only applicable to an ad hoc network but also to an infrastructure network. In an infrastructure network, a wireless network identifier is efficiently generated to allow a game device to participate in a wireless network, by providing an access point with the function of setting up an SSID.

By setting up an SSID as described in the illustrative example, BSS search is achieved easily. When there are on the order of 10-1000 other game devices in the neighborhood, generating a list of all BSSs in the neighborhood and causing it to be displayed on the monitor of the game device 2 for user selection may result in a huge list that cannot be stored in a memory of the game device 2. Since the number of BSSs located in the neighborhood is unknown, it may be possible to enlarge the memory capacity in anticipation of any conceivable situations. Meanwhile, it is naturally more cost-effective to configure the memory capacity to be small. Therefore, it is favorable, in respect of cost and processing time, that the BSS list generated be sufficiently small to be handled by a small memory capacity.

For this reason, the game device 2 may search for BSSs in the neighborhood and list only those SSIDs that include a predetermined pattern. By filtering the SSIDs, the number of SSIDs listed is limited. According to this approach, the scale of the list is reduced. It is thus possible for a memory of a small capacity to retain the list. For example, in order to generate a list of BSSs that are running the game application A, only those BSSs with an SSID that includes "PT-TITLE_A" may be retrieved so that the other BSSs may be excluded. With this, the data volume of the list is reduced and efficient BSS search is achieved.

In the illustrative example, only one wireless network identified by the SSID "PT-TITLE_A-LOBBY" is shown as a lobby IBSS of the application A. In a variation, there may be a plurality of lobby IBSSs in the environment. For example, there may be formed a plurality of lobby IBSSs depending on the game skill. In this case, a lobby IBSS for beginners, a lobby IBSS for intermediate players and a lobby IBSS for advanced players, etc. may be formed. The SSID of the lobby IBSS for beginners may be "PT-TITLE_A-LOBBY-CLASS_1", the SSID of the lobby IBSS for intermediate players may be "PT-TITLE_A-LOBBY-CLASS_2" and the SSID of the lobby IBSS for advanced players may be "PT-TITLE_A-LOBBY-CLASS_3". As described above, it is preferable that the SSIDs of the lobby IBSSs of the same title be associated with each other by including in the SSIDs a predetermined pattern (in this case, "PT-TITLE_A-LOBBY"). With the benefit of this association, it is easy to search for lobby IBSSs of a given title. By allowing game devices 2 to search for BSSs in the neighborhood and acquire only those SSIDs that include "PT-TITLE_A-LOBBY", the user can efficiently acquire a list of lobby IBSSs of the game application A and can easily select a lobby IBSS sought to be connected.

While the preferred embodiments of the present invention have been described using specific terms, such description is for illustrative purposes only, and it is to be understood that changes and variations may be made without departing from the spirit or scope of the appended claims.

What is claimed is:

1. A method for communicating in a network, comprising the steps of:
   setting up a service set identifier (SSID) by a user device, wherein the SSID includes an application identifier that identifies an application currently executed by the user device,
   wherein the SSID includes a status value indicating a current mode of operation of the application on the user device,
   wherein a first SSID having a first status value is broadcast when the application is executed in a first mode, and,
   wherein the first SSID is changed to a second SSID having a second status value, different from the first status value, when the application is executed in a second mode,
   wherein the second status value indicates that the user device and another user device are each concurrently executing the application program in the second mode.

2. The method according to claim 1, wherein the first status value indicates a lobby mode and the second status value indicates a game mode.

3. The method according to claim 1, wherein, when the another user device connects to the user device, the another user device generates a random number which is transmitted to the user device, and the user device adds the random number to the second SSID.

4. A communication method comprising:
   setting up a first service set identifier (SSID) for communication in a wireless network, wherein the first SSID includes an application identifier and a first status value indicating a first mode of operation of an application on the wireless communication terminals, and wherein the application identifier is uniquely defined for an application executed in one or more wireless communication, said first SSID being searchable within the wireless network by the one or more wireless communication terminals;

establishing a wireless network between the one or more wireless communication terminals based on a search of the first SSID, establishing a second wireless network between at least two of the one or more wireless communication devices, wherein the second wireless network has a second SSID comprising a second status value, different from the first status value, the second status value indicating that the application program is concurrently executed in a second mode by the at least two of the one or more wireless communication devices.

5. The communication method according to claim 4, further comprising setting up a communication channel based on the SSID.

6. The method of claim 4, wherein the SSID comprises a character string including the application identifier and the status value.

7. A wireless communication terminal comprising:

a service set identifier (SSID) setting unit which sets up a first SSID for communication over a wireless network, wherein the first SSID includes an application identifier uniquely defined for an application to be executed by the wireless communication terminal; and a channel setting unit which sets up a communication channel between the wireless communication terminal and at least one other wireless communication terminal over the wireless network based on the first SSID, wherein the SSID setting unit generates the first SSID to include a first status value indicating a first mode of operation of the application on the wireless communication terminal, wherein the first SSID is changed to a second SSID having a second status value, different from the first status value, when the application is executed in a second mode, wherein the second status value indicates that the wireless communication terminal and wireless communication terminal are each concurrently executing the application program in the second mode.

8. The method of claim 7, wherein the SSID comprises a character string including the application identifier.

9. The method of claim 8, wherein the character string includes a status value of the application.

10. An article comprising a non-transitory computer-readable storage medium having embodied thereon a program, the program being executable by a device to perform:

setting up a first service set identifier (SSID) for communication over a wireless network, wherein the first SSID is generated to include an application identifier uniquely defined for an application to be executed on the device and a first status value indicating a first mode of operation of the application, and establishing a wireless network between the device and other devices based on the first SSID generated, and establishing a second wireless network between the device and at least one other device, wherein the second wireless network has a second SSID comprising a second status value, different from the first status value, the second status value indicating that the application program is concurrently executed in a second mode by the device and the at least one other device.

* * * * *